United States Patent [19]
Maffei et al.

[11] 3,918,961
[45] Nov. 11, 1975

[54] METHOD OF REMOVING BULK SODIUM FROM METALLIC SURFACES

[75] Inventors: Hector P. Maffei, Richland; Ronald R. Borisch, Kennewick, both of Wash.

[73] Assignee: The United States of America as represented by the United States Energy Research and Development Administration, Washington, D.C.

[22] Filed: Dec. 12, 1974

[21] Appl. No.: 532,138

[52] U.S. Cl. .................. 75/97 A; 75/66; 75/121; 176/38; 423/180
[51] Int. Cl.² .................................. C22B 27/00
[58] Field of Search ............ 75/66, 63, 97 R, 97 A, 75/121; 423/180; 176/38

[56] References Cited
UNITED STATES PATENTS

| | | |
|---|---|---|
| 1,532,489 | 4/1925 | Heinze .................. 423/180 |
| 3,326,674 | 6/1967 | Neipert et al. .......... 75/97 R |
| 3,551,096 | 12/1970 | Tsao ..................... 75/121 |
| 3,745,068 | 7/1973 | Fischer .................. 176/38 |

*Primary Examiner*—L. Dewayne Rutledge
*Assistant Examiner*—M. J. Andrews
*Attorney, Agent, or Firm*—Dean E. Carlson; Robert M. Poteat

[57] ABSTRACT

A process of removing sodium from an article, particularly one made of stainless steel, by treating it with a mixture of water vapor and a gas which is inert to sodium. By selecting combinations of temperature and water vapor-to-gas ratio, the reaction temperature is controlled to prevent damage to the articles.

10 Claims, 2 Drawing Figures

METHOD OF REMOVING BULK SODIUM FROM METALLIC SURFACES

CONTRACTUAL ORIGIN OF THE INVENTION

This invention was made in the cause of or under a contract with the United States Atomic Energy Commission.

BACKGROUND OF THE INVENTION

Certain types of nuclear reactors are cooled by circulating molten sodium. The sodium is pumped through valves, heat exchangers, and other equipment. From time to time, it is necessary to shut down the system and remove certain components, which are frequently encrusted with sodium. The components are usually made of stainless steel.

The removal of the sodium presents problems because of the violence with which sodium reacts with water, producing sodium hydroxide and evolving hydrogen. The reaction is highly exothermic, so much so that, in the presence of air, the hydrogen may burst into flame or explode.

Even in the absence of air, there may be such a great temperature rise from this phenomenon as to damage equipment and cause severe operating problems.

Processes are known in which sodium is removed by treatment of the contaminated equipment with mixtures of water vapor and nitrogen, the water vapor constituting 15 percent to 50% by volume of the mixture. The treatment has been carried out at temperatures in the range of 225°F to 250°F. The stainless steels exhibit the phenomenon, for example, of "caustic cracking" in the presence of sodium hydroxide at elevated temperatures. The temperature in this process should be kept below 250°C, which appears to be the threshold temperature for the caustic cracking. These procedures have been proven suitable for the removal of sodium from crevices and wetted surfaces, but not for the removal of bulk sodium, such as heels in the bottoms of vessels. The use of such processes on bulk sodium results in violent reactions and temperatures of the component being cleaned exceeding 500°F.

Processes are also known in which the sodium is removed by treatment with an alcohol in the liquid state. As compared to the moist gas method, these are more expensive, present a greater fire hazard and are less successful in reaching equipment surfaces, particularly inverted pockets and crevices.

The object of this invention is to provide a sodium removal process suitable for removing bulk sodium deposits from metallic equipment, particularly that made of stainless steel.

SUMMARY OF THE INVENTION

This invention involves the treatment of metallic, particularly stainless steel, equipment with a certain range of mixtures of water vapor and a gas which is inert to sodium, preferably nitrogen, with the gas inlet temperature being maintained within a certain range, the initial temperature of the equipment being at or below that temperature. The component being treated is then ordinarily rinsed with water to remove residual caustic and solvent contaminants.

DETAILED DESCRIPTION

Figure 1:
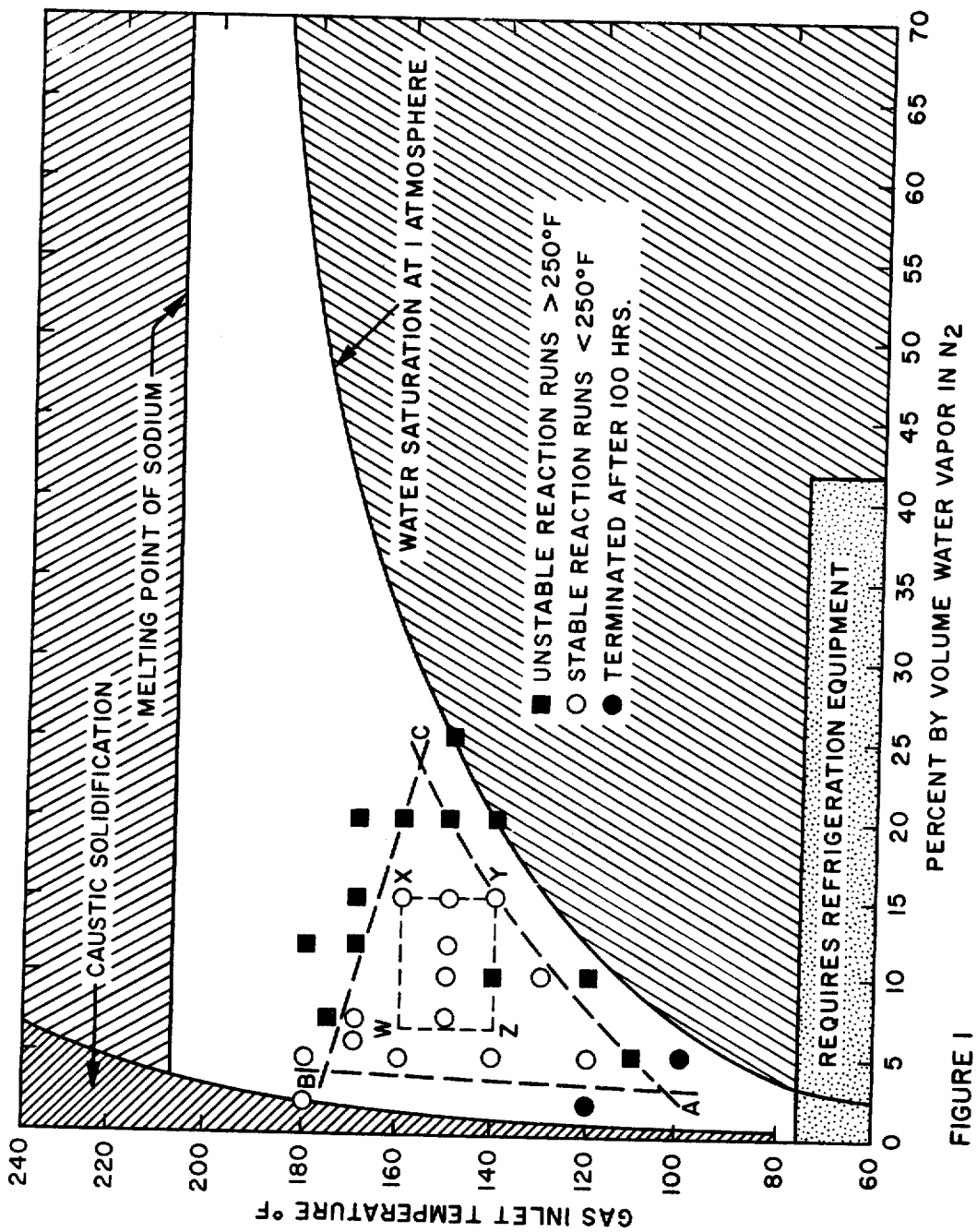
FIG. 1 is a graph showing the acceptable and preferred temperature and composition ranges of the present invention.

We have found that water vapor concentrations and initial temperatures falling with the area ABC, FIG. 1, are satisfactory for removing bulk sodium from surfaces without the heretofore mentioned problems. The preferred conditions for our bulk sodium removal are a water vapor concentration of 7.5 to 15 percent by volume and an initial temperature of 140°F to 160°F, indicated by the area WXYZ given in FIG. 1.

Treatment at these temperatures, for example of metallic articles, results only in a moderate temperature rise and the formation of a liquid solution of sodium hydroxide in contact with unreacted sodium. Beneficially, the sodium hydroxide dilutes the water to such a degree that the reaction of the water with the sodium is of moderate velocity. At the same time there is no solidification of the sodium hydroxide solution. Solidification is undesirable, since it would cause a temporary cessation of reaction followed by violent thermal spikes due to cracking of the solidified caustic allowing water or very dilute caustic to contct a fresh sodium surface.

Further illustration of the quantitative aspects and procedures of the present invention is provided in the following examples.

EXAMPLE I

Preliminary screening tests of the use of water vapor and a gas which is inert to sodium to remove sodium were carried out in an autoclave. Bulk sodium pools were simulated by pouring sodium into 2 inch and 4 inch diameter stainless steel cups. The cups were designed with thermowells into which thermocouples could be inserted for measuring the temperature of the reacting sodium and also the gas temperature above the reacting sodium. The autoclave was provided with connections for supplying controlled mixtures of nitrogen and water vapor and with a gas sniffer tube over the reaction cup. The sniffer tube allowed a semi-quntitative measurement of hydrogen evolved from the sodium-water reaction.

As a result of these experiments certain broad criteria were established for removal of bulk sodium from metallic surfaces: (1) The reaction temperature always exceeded 250°F if the feed temperature of the water vapor-mixture nitrogen was above the melting point of sodium (208°F) at the start of the reaction. (2) To obtain a reasonable rate, the H₂O water vapor over pressure in the system must be high enough to enable the caustic to form a liquid phase. (3) The practical lower temperature should be above ambient in order to hold the viscosity of the caustic phase at a sufficiently low value. (4) The reaction was much more controlled at the lower temperature and moisture concentrations.

These criteria were used as guides in further process development. The investigations for bulk sodium removal were then carried out in a special Sodium Removal Development Apparatus (SRDA), which included a treatment tank, a supply of a mixture of nitrogen and water vapor at a pressure slightly above atmospheric, and temperature control. Sodium samples like those described in EXAMPLE 1 were placed in the tank. Investigations were carried out to establish an operating "envelope" of conditions which would allow a controlled dissolution of bulk sodium by moist nitrogen gas. Nitrogen gas temperatures and moisture concentrations which, in the light of the prior work, offered reasonable chances of success were chosen for testing. Exploratory tests were run with moisture concentrations ranging from 2 to 25 volume percent (V/O) and gas temperatures from 100°F to 180°F. The results are tabulated in Table I. The results shown include only steady state runs.

As an added safety measure to avoid thermal spikes during bulk sodium reactions, conservative operating tolerances were established. These limits are temperatures of 140°F to 160°F and water vapor concentrations of 75% to 15% water vapor in the nitrogen gas. They are shown in FIG. 1 by the rectangle WXYZ. Ten runs utilizing 4 inch diameter sodium pots (14. inc.) were processed under these conditions. The results are tabulated in Table II. The one over temperature run is the same run discussed above.

TABLE I

| SRDA SODIUM REMOVAL RUNS USED IN DETERMINING PROCESS CONTROL | | | | | | |
|---|---|---|---|---|---|---|
| $H_2O$ Conc. (V/O) | Inlet Gas Temp. (°F) | Max. Temp. (°F) | Time Required for Completion(Hrs) | Hrs/In | Na Depth (Inches) | Run Number |
| 25 | 150 | 273 | 32 | | 1.0 | 28 |
| 20 | 170 | 485 | — | | 1.0 | 16 |
| | 160 | >500 | — | | 0.5 | 38 |
| 20 | | | | | | |
| 20 | 150 | 296 | 12 | | 0.5 | 26 |
| 20 | 140 | 500 | 17 | | 0.5 | 40 |
| 15 | 170 | >500 | 48 | | 2.0 | 15 |
| 15 | 160 | <250 | 25 | 50 | 0.5 | 39 |
| 15 | 150 | <250 | 55 | 55 | 1.0 | 13 |
| 15 | 140 | <250 | 17 | 34 | 0.5 | 35 |
| 12 | 180 | 270 | 20 | | 0.5 | 6 |
| 12 | 170 | 490 | 20 | | 0.5 | 10 |
| 12 | 150 | <250 | 20 | 40 | 0.5 | 5 |
| 10 | 150 | <250 | 134 | 45 | 3.0 | 67 |
| 10 | 150 | <250 | 107 | 54 | 2.0 | 54 |
| 10 | 150 | <250 | 82 | 41 | 2.0 | 56 |
| 10 | 150 | <250 | 82 | 41 | 2.0 | 59 |
| 10 | 150 | <250 | 60 | 60 | 1.0 | 55 |
| 10 | 140 | 285 | 32 | 62 | 0.5 | 41 |
| 10 | 130 | <250 | 68 | | 0.5 | 37 |
| 10 | 120 | 446 | 30 | | 0.5 | 27 |
| 7.5 | 175 | 325 | 25 | | 0.5 | 2 |
| 7.5 | 170 | <250 | 20 | | 0.5 | 3 |
| 6.0 | 170 | 250 | 48 | | 0.5 | 8 |
| 5.0 | 180 | <250 | 70 | | 0.5 | 33 |
| 5.0 | 160 | <250 | 75 | | 0.5 | 32 |
| 5.0 | 140 | <250 | 63 | | 0.5 | 36 |
| 5.0 | 120 | 250 | 41 | | 0.5 | 29 |
| 5.0 | 110 | 310 | — | | 0.5 | 42 |
| 5.0 | 100 | <250 | >120 | | 0.5 | 34 |
| 2.0 | 180 | 570 | >100 | | 0.5 | 31 |
| 2.0 | 120 | 518 | >100 | | 0.5 | 30 |

TABLE II

| BULK SODIUM REMOVAL RUNS OPERATED WITHIN RECOMMENDED OPERATING MOISTURE AND TEMPERATURE LIMITS (7.5-15% $H_2O$, 140°-160°F) | | | | | |
|---|---|---|---|---|---|
| $H_2O$ Conc. (V/O) | Inlet Gas Temp. (°F) | Maximum Sodium Temp. (°F) | Time Above 250°F (Hrs) | Reaction Time (Hr/In Na) | Run Number |
| 15 | 160 | <250 | 0 | 52 | 39 |
| 15 | 150 | <250 | 0 | 57 | 13 |
| 15 | 140 | <250 | 0 | 34 | 35 |
| 12 | 150 | <250 | 0 | 38 | 5 |
| 10 | 150 | <250 | 0 | 54 | 54 |
| 10 | 150 | <250 | 0 | 60 | 55 |
| 10 | 150 | <250 | 0 | 41 | 56 |
| 10 | 150 | <250 | 0 | 41 | 59 |
| 10 | 150 | <250 | 0 | 46 | 67 |
| 10 | 140 | 285 | 0.16 | 64 | 41 |

The results of Table I were then plotted graphically, giving the diagram shown in Figure 1. Attention is called to the area ABC which defines a stable reaction envelope in which bulk sodium can be reacted without exceeding the 250° F limitation which is the threshold temperature at which caustic cracking occurs.

Within this stable reaction envelope, 15 out of 16 runs were processed with reaction temperatures of less than 250° F. The one exception exceeded 250° F by only 35° F and for only 0.16 hour. In contrast, 14 out of 15 runs processed outside of the control envelope produced unsatisfactory results.

EXAMPLE II

Theoretical consideration of the reaction occurring within the experimental pots focused attention on the role of the caustic solution layer. When such a layer has accumulated over the active sodium, a two step process occurs. First, moisture condenses into the solution and then sodium reacts with the caustic solution. The solution layer effectively isolates the sodium from the direct action of the vapor. When relatively deep pools of sodium hydroxide solution form, there is a tendency for a concentration gradiant of sodium hydroxide in water to develop varying from relatively concentrated in contact with the sodium to relatively dilute in contact with the gas. This may be the source of some of the instabilities observed in the runs in the SRDA.

Two tests were performed in which the caustic solution could drain continuously to determine if the stability could be improved. In the first experiment, a 0.2 inch thick slab of sodium resting on a stainless steel plate was processed in the SRDA at 10 vol.% water vapor in nitrogen and 150°F gas feed temperature. The exposed area of sodium was 66 sp. in., slightly larger than the area exposed (50 sq. in.) in an 8 in. diameter pot. In the second experiment a regular 12 in. diameter pot was used, but it had a 1 in. diameter hole drilled through the bottom of the pot and the sodium. In both cases the runs went smoothly, without temperature spiking.

Previous experience indicated that areas as large as these might be expected to experience spiking if run in the closed pot situation with caustic solution contained over the sodium. These tests indicate the importance of the caustic solution in determining the course of the reaction and the desirability of providing for its continuous drainage.

EXAMPLE III

In order to provide assurance that consistent results could be obtained on actual components and that no damage to those components would result, a number of 3 inch sodium valves contaminated with 0.5 to 5 lbs. of sodium were treated by water vapor-nitrogen mixtures in the SRDA at conditions falling within the limits established above and finally rinsed with water.

All the valves were completely cleaned of sodium. The maximum temperatures never exceeded 230°F during any phase of the cleaning process. No damage was apparent on inspection. In order to provide confirmation of the results, one valve was sectioned. This revealed the fact that the valve had been completely cleaned of sodium with no detrimental effects. The outer "Croloy" body was discolored from normal oxidation during processing, but the valve's stainless steel bellows and plug showed no signs of corrosion or caustic cracking. "Croloy" is an alloy consisting essentially of 2 ¼% chromium, 1% molybdenum, balance iron.

EXAMPLE IV

While relatively small components such as the valves discussed in Example III are best cleaned in a treatment tank, large units require different handling. To demonstrate the applicability of our process to such equipment, it was applied to a 13,000 gpm centrifugal sodium pump which was extensively contaminated with sodium. It had been operated in excess of 40,000 hours at temperatures below 800°F.

Because of the large size of the pump, its own outer "Croloy" case was used as the cleaning vessel. This was connected to the SRDA in such a manner as to replace the cleaning tank, which was bypassed. Two thermocouples monitored the outer case temperature, three the pump impeller and one the moist gas inlet temperature.

A hot (140°–160°F) nitrogen purge of the pump was performed in order to reduce the oxygen level to less than 1% and also heat the pump to a minimum temperature of 100°F. Heating was required to prevent condensation of the water vapor during cleaning. Processing was started with the addition of 5 vol.% water vapor to the nitrogen gas stream. The progress of the sodium removal reaction was followed by monitoring the hydrogen concentration in the effluent gas.

Figure 2:
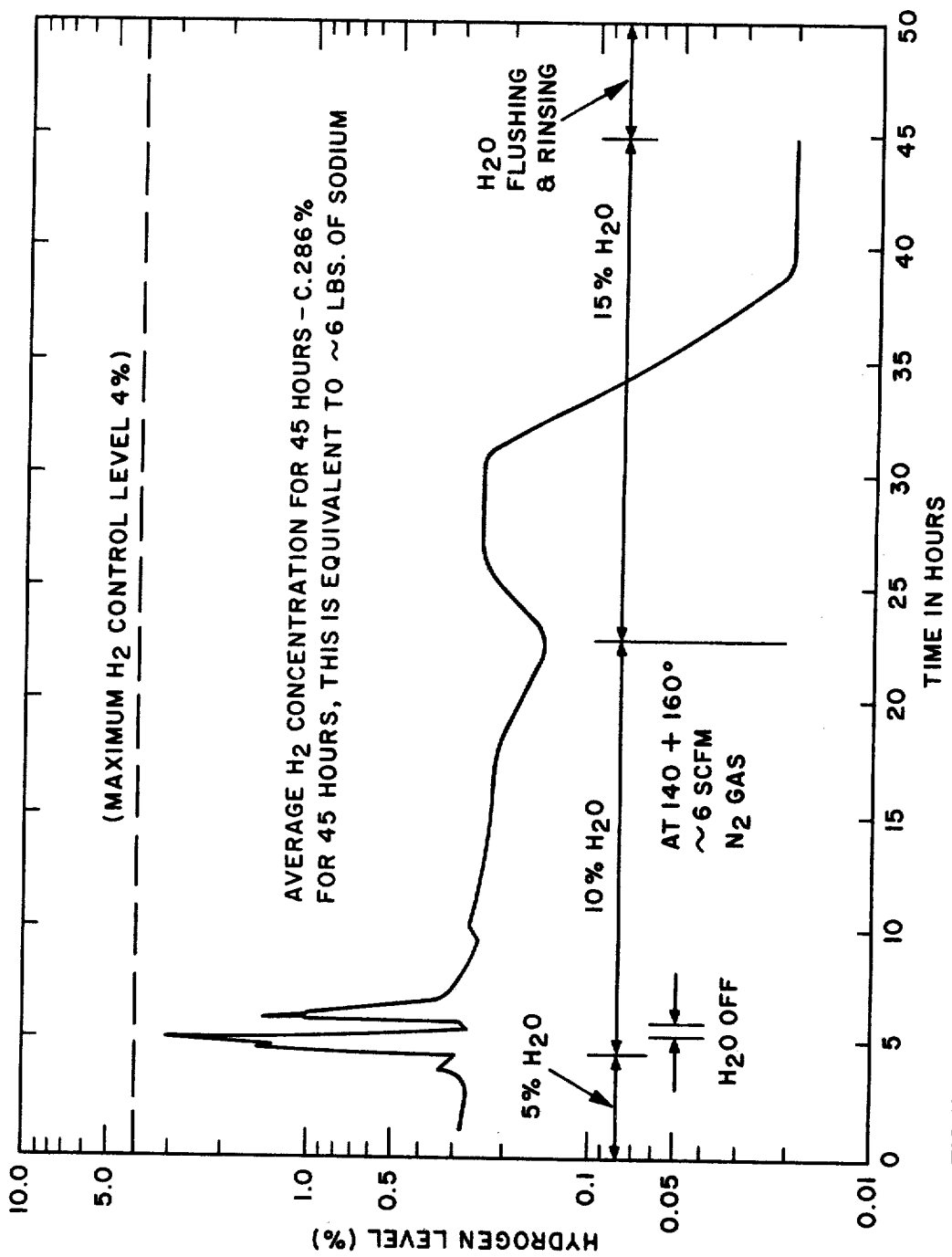
FIG. 2 is a graph showing the decontamination of a large sodium pump in accordance with this invention.

This treatment and its progress are shown graphically in FIG. 2 and tabulated in Table III.

TABLE III

| SODIUM PUMP PROCESSING CONDITIONS | |
|---|---|
| Moist Gas | 46.5 hours |
| Water Rinsing | 32.5 hours |

TABLE III (Cont'd.)

SODIUM REMOVED 6.2 lbs. calculated from water rinse analysis
5.8 calculated from $H_2$ evolution
($H_2$ evolved was not measured during water rinsing. The difference of 0.4 lb. represents the sodium removal from crevices during water rinsing.)

After processing the pump for four hours at 5 vol.% $H_2O$ vapor, it was decided to increase the concentration to 10 vol.% $H_2O$ since the $H_2$ evolution rate was being maintained below 1 vol.%. As soon as this increase was made, the $H_2$ evolution started to increase. When it approached 4 vol.%, water vapor addition was stopped temporarily. The $H_2$ rate responded immediately by falling rapidly. Water vapor addition was then resumed at the same level and $H_2$ evolution rate had fallen to near 0.15%, so water vapor was increased to 15 vol.%. Hydrogen evolution again rose, reaching 0.25%, then falling off to 0.02% after 40 hours and did not change subsequently. (See FIG. 2). The temperatures being monitored throughout the pump did not change by more than °F throughout the processing. The mean temperature gradually rose after each increase in steaming rate, in response to the warmer gas temperature produced by the higher steam contents. The maximum temperature reached at any point was 175°F. (See Table IV).

TABLE IV

| MAXIMUM TEMPERATURE OBSERVED DURING PUMP CLEANING BY WVN (WATER VAPOR PLUS NITROGEN) | |
|---|---|
| Pump Impeller | 170°F |
| Pump Inner Barrel | 175°F |
| Outside of Pump Pump Volute | 120°F |
| Outer Barrel | 130°F |
| Maximum Rinsing Temperature | 160°F |

It must be emphasized that the rise in $H_2$ evolution, noted when the steaming rate was increased, was not an uncontrolled spike like those observed in development testing with confined pools of sodium. Such a spike does not respond to changes in the water-vapor inlet rate, since it involves reaction with the liquid caustic solution confined above the pool in a pot. Absence of thermal spikes during cleaning of the pump was confirmed by the constancy of measured temperatures. All temperatures throughout the components were maintained well below the 250°F stress corrosion cracking threshold, with no temperature exceeding 175°F.

Following the moist gas-sodium reaction phase, the pump was rinsed with a total of 15 deionized water rinses, six of which were partial volume flushes aimed at removing liquid trapped in the pump volute. The bottom of the volute could not be reached because of the cover plates welded in place when the pump was removed from the reactor system. The rinses and their resulting sodium concentrations are shown in Table V. The first three or four rinses appeared to clean the pump internals as well as can be judged. The pH of the rinses ranged from approximately 9.3 for rinse 11 to 11.5 for rinse 3. The resistivity of the rinse water was never greater than 2000 ohms when rinsing was terminated.

TABLE V

WVN RINSE CONDITIONS FOR SODIUM PUMP

| Rinse No. | Volume (liters) | Sodium Conc. (grams/liters) | Total Sodium (grams) | pH | Remarks |
| --- | --- | --- | --- | --- | --- |
| 1 | 8 | 35.2 | 281 | 11.9 | Caustic drained from pump |
| 2 | 38 | 32.8 | 1240 | 12.1 | |
| 3 | 983 | 0.74 | 727 | 11.5 | |
| 4 | 983 | 0.09 | 88 | 10.7 | |
| 5 | 983 | 0.07 | 69 | 10.4 | |
| 6 | 983 | 0.06 | 60 | 10.2 | |
| 7 | 423 | 0.10 | 42 | 10.3 | |
| 8 | 423 | 0.25 | 106 | 10.6 | |
| 9 | 423 | 0.18 | 76 | 10.5 | |
| 10 | 423 | 0.03 | 13 | 9.7 | |
| 11 | 983 | 0.01 | 10 | 9.3 | |
| 12 | 983 | 0.07 | 69 | 10.1 | |
| 13 | 423 | 0.04 | 17 | 9.8 | |
| 14 | 983 | 0.03 | 25 | 9.7 | |
| 15 | 423 | 0.07 | 29 | 10.1 | |
| 16 | 983 | 0.04 | 39 | 9.8 | |
| 16 | 983 | 0.04 | 39 | 9.8 | |

While we have described specific embodiments of our process, it will be apparent that various changes can be made without departing from the scope of our invention. For example, while we have described the use of nitrogen, any other gas which is inert to sodium under the operating conditions can be substituted. For example, argon or helium could be used. However, the lower price of nitrogen makes its use preferable from a monetary standpoint. While the process is particularly desirable as applied to stainless steel, it is also advantageous as applied to other metals and ceramics which might be harmed by uncontrolled increase in temperature.

We therefore wish our invention to be limited solely by the scope of the appended claims.

What is claimed is:

1. A process of removing sodium from an article within an enclosed space which comprises introducing into said enclosed space a mixture of water vapor and another gas at a gas inlet temperature and composition falling within the area ABC of FIG. 1 of the accompanying drawing, said other gas being one which is inert to sodium at said temperature.

2. A process as defined in claim 1 wherein said temperature is in the range 140°F to 160°F and the water vapor concentration is in the range 7.5 to 15% by volume.

3. A process as defined in claim 1 wherein said other gas is nitrogen.

4. A process as defined in claim 2 wherein said other gas is nitrogen.

5. A process as defined in claim 1 wherein sodium hydroxide solution which forms in contact with the sodium is continuously drained away.

6. A process as defined in claim 1 wherein said article is made of stainless steel.

7. A process as defined in claim 2 wherein said article is made of stainless steel.

8. A process as defined in claim 3 wherein said article is made of stainless steel.

9. A process as defined in claim 4 wherein said article is made of stainless steel.

10. A process as defined in claim 5 wherein said article is made of stainless steel.

* * * * *